July 26, 1938.  M. A. PALEN  2,125,195
INTERNAL COMBUSTION ENGINE
Filed Oct. 15, 1936  2 Sheets-Sheet 1
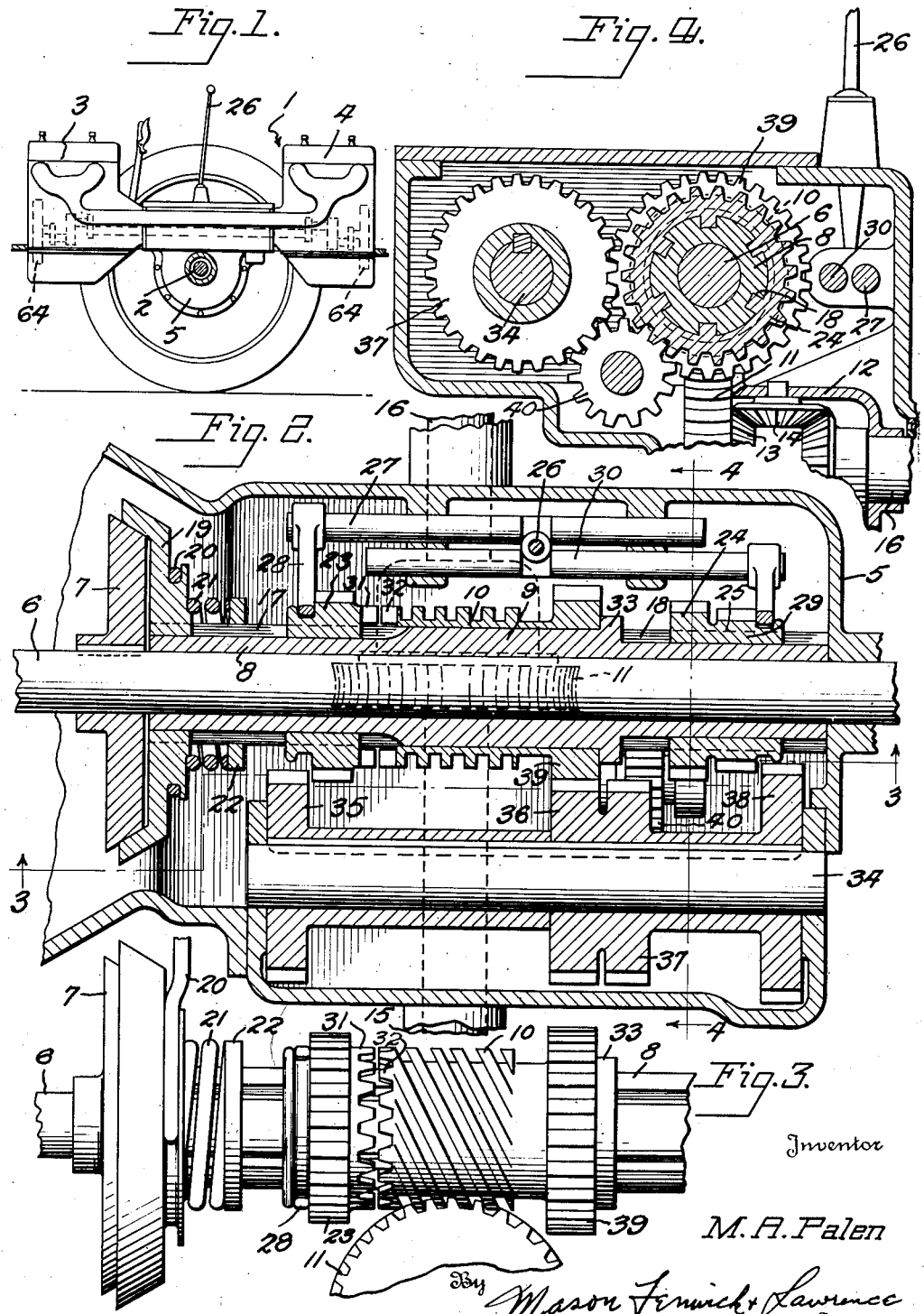
Inventor
M. A. Palen
By Mason Fenwick & Lawrence
Attorneys

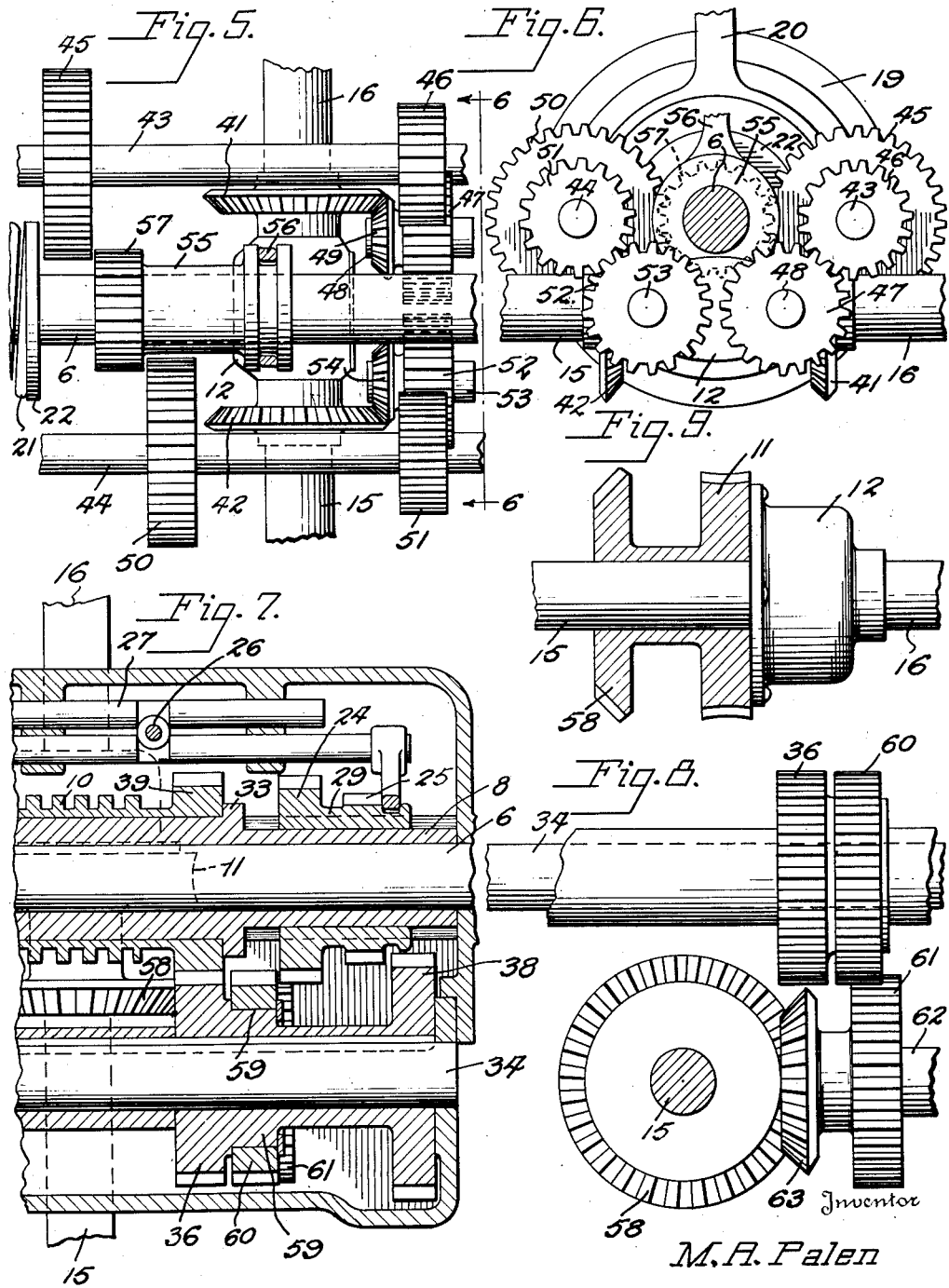

Patented July 26, 1938

2,125,195

UNITED STATES PATENT OFFICE 2,125,195

INTERNAL COMBUSTION ENGINE

Matthew A. Palen, Washington, D. C.

Application October 15, 1936, Serial No. 105,772

8 Claims. (Cl. 180—54)

This invention relates to an internal combustion engine power plant for auto vehicles. It proposes as its general object a construction in which the transmission mechanism is so distributed and arranged as to be substantially balanced symmetrically with respect to the axis of the engine crank shaft as well as relative to a plane perpendicular to the axis of the crank shaft passing through the center of gravity of the engine.

While such a construction may be advantageously applicable to general uses, I have devised it particularly for an engine to be employed in the motorized infantry cart described and claimed in my Patent No. 2,046,424, granted July 7, 1936. This cart contemplates the provision of an engine, the weight of which is balanced with respect to the vehicle axle so that the men pulling the cart are relieved substantially from the burden of the weight of the power plant.

One of the more specific objects of the invention is to provide an internal combustion engine in which the weight of the differential as well as the transmission gear is substantially balanced symmetrically with respect to a line perpendicular to the axis of the crank shaft and passing through the center of gravity of the engine.

A further object of the invention is the provision in an engine as described of substantially balanced transmission gear including the differential, within the crank case of the engine.

One species of the invention relates to an internal combustion engine with symmetrically balanced sliding gear transmission. Another species relates to a symmetrically balanced direct torque transmission both in forward and reverse directions, while a third species of the invention contemplates a symmetrically balanced transmission in which sliding gears are employed for the forward speeds while the reverse is in direct torque drive to the motor.

Other objects of the invention will appear as the following description of a preferred and practical embodiment thereof proceeds.

In the drawings which accompany and form a part of the following specification and throughout the several figures of which the same characters of reference have been employed to designate identical parts:

Figure 1 is a side elevation partly in section illustrating an internal combustion engine power plant embodying the features of my invention mounted in balanced relation to the vehicle axle of a tactical infantry cart, the tongue and other portions of the cart being omitted;

Figure 2 is a horizontal section through one species of my invention showing sliding gear transmission;

Figure 3 is a vertical section taken along the line 3—3 of Figure 2;

Figure 4 is a vertical section taken along the line 4—4 of Figure 2;

Figure 5 is a plan view of another species of my invention;

Figure 6 is a section taken along the line 6—6 of Figure 5;

Figure 7 is a plan view of still another species in which forward speed changes are made by sliding gears while the reverse speed is in direct torque drive;

Figure 8 is a side view partly in section of the lay shaft gears and the underlying transmission gears concerned with the reverse drive; and Figure 9 is a detail partly in section showing the torque drive connection with the differential.

Referring now in detail to the several figures and first adverting to the general assemblage illustrated in Figure 1, this shows a multi-cylinder internal combustion engine 1 balanced over the axle 2 of a two-wheeled infantry equipment cart and for the purpose of compactly disposing the balanced transmission gear, the cylinders are shown separated into blocks 3 and 4 symmetrical with respect to the vehicle 2, and it being assumed that if desired and for the purpose of securing accurate balance the fly wheel may be divided, a relatively small fly wheel 64 being secured at opposite ends of the crank shaft. Preferably the transmission gearing including the differential are enclosed within the crank case 5 of the engine.

Referring now to Figures 2, 3 and 4 which disclose the transmission mechanism of the engine shown in Figure 1, the numeral 6 represents that portion of the engine crank shaft which extends between the blocks of cylinders. One of the clutch members 7 is fast to this shaft and is the only element shown in the figures which is rigidly secured thereto. A sleeve 8 is revolubly mounted on the crank shaft between the clutch member 7 and the opposite side of the crank case 5. The sleeve 8 has a central portion 9 of enlarged diameter on which is revolubly mounted a worm 10. The worm in turn is in mesh with a worm wheel 11 fixed to the differential cage 12 fragmentarily indicated in Figure 4. The differential contains the usual intermeshing pinions 13 and 14 which control the independent or correlated rotation of the vehicle axle halves 15 and 16.

The worm 10 is located on the intermediate part of the crank shaft so that the transmission gear assembly can be positioned substantially symmetrically over the differential and over the axle of the vehicle. On either side of the enlarged portion 9 of the sleeve 8 the sleeve is formed with splines 17 and 18. On the left side as viewed in Figure 2, the sleeve is provided with the clutch member 19 complementary to the clutch member 7 and operated by the usual yoke 20 against the tension of a spring 21 held in compressed relation to the clutch member 19 and a fixed collar 22. The spring 21 holds the clutch members in engagement; the yoke 20 releases the clutch. Slidably mounted upon the splines 17 is a gear 23 operated by means of a gear shift lever 26 and a reciprocable rod 27 selectively actuated either in a right or left direction by the gear shift lever 26 in conventional manner. At the end of the rod 27 is a yoke 28 which engages in a groove in the hub of the gear 23.

On the splines 18 a gear block 29 is mounted having the gears 24 and 25 operated through the gear shift lever and through a reciprocable bar 30 in a manner well understood.

When the clutch is in release position, the crank shaft 6 together with the clutch member 7 rotates independently of any other element of the transmission. When the clutch members 7 and 19 are in engagement the sleeve 8 revolves, rotating the gears 23, 24 and 25, but when these gears are in neutral position no movement is transmitted to the worm or the differential gearing with which it is entrained.

The gear 23 and the worm 10 are provided on their confronting faces with teeth 31 and 32 adapted to interdigitate when the gear 23 is moved in a rightward direction. Thus the worm 10 is directly connected to power. End thrust of the worm is withstood by a collar 33 on the sleeve 8.

The transmission includes a lay shaft 34 parallel to the axis of the crank shaft and journalled in suitable bearings in the crank case 5. The lay shaft carries the fixed gears 35, 36, 37 and 38. The gear 36 is constantly in mesh with a gear 39 on the worm and while the gear shift lever 26 is in neutral position, the lay shaft is quiescent, no movement being transmitted to the worm and to the differential. The gears 23 and 35 are slid into mesh for low speed ratio, rotating the lay shaft and with it the gear 36 imparting rotation to the worm and through the differential to the vehicle axle. When the gear 25 is slid into mesh with the gear 38 the lay shaft 34 is rotated at intermediate speed ratio, movement being transmitted through the gears 36 and 39 to the worm 10. The customary idler gear 40 acts as an intermediary between the gear 24 and the gear 37 on the lay shaft for reverse drive. The idler 40 is in constant mesh with the gear 37 and the gear 24 is slid into mesh with the idler 40.

It will be observed from Figure 3 that the worm 10 is the "fast" type, that is to say, it is not irreversible so that the vehicle driven by the motor can coast in gear and that it can be pulled by man power without material impediment from the worm drive, for when the gear shift mechanism is in neutral position only the worm and the lay shaft 34 rotate with the movement of the vehicle wheels. It will be understood that by the arrangement of the worm at an intermediate position, above the differential and by the disposition of the low and intermediate and reverse gears on opposite sides of the worm, a substantially balanced unit is provided, the weight of the clutch being off-set by the preponderant mass of the gears on the opposite side of the axis of the differential. Also considering the crank shaft as the axis of symmetry, the transmission is substantially balanced by the arrangement of the gear shifting mechanism on one side of the crank shaft and the lay shaft on the other.

It is most important in an infantry equipment cart that space be reserved between the wheels and the adjacent axle portions for balancing equipment units such as wire reels, stretchers, ammunition boxes, etc., and the balanced type of internal combustion power plant as above described is eminently adapted for use with a vehicle of this type.

Figures 5 and 6 illustrate a modified form of the invention in which the sliding gears are substituted by direct torque drive both for forward speed and reverse. In this group of figures, the numeral 6 represents the crank shaft of the engine, 15 and 16 being the halves of the vehicle axle which emanate from the differential cage 12. In this form of the invention the differential cage 12 is provided with two ring gears 41 and 42 which are alternatively operated, one for reverse speed and the other for forward drive. Said ring gears are each provided with a train of mechanism including lay shafts 43 and 44. For balancing purposes, the lay shafts 43 and 44 cross the axis of the vehicle axle. On one side of the vehicle axle, the lay shaft 43 is provided with a gear 45 and on the other side with a gear 46 which is constantly in mesh with a gear 47 on a stub shaft 48, the gear 47 being unitary with a bevelled gear 49 constantly in mesh with the ring gear 41. The lay shaft 44 is provided on one side with a gear 50 and on the opposite side with a gear 51 in constant mesh with a gear 52 on a stub shaft 53, the gear 52 being unitary with the bevelled gear 54 which is in constant engagement with the ring gear 42.

A sliding sleeve 55 is slidably mounted upon the crank shaft 6 engaged at one end by an operating yoke 56 and carrying at the other end a gear 57 which can be selectively meshed either with the gear 45 or gear 50 according to whether the gear 57 is moved to the right or leftward. Since the gears 45 and 50 are on opposite sides of the gear 57, they operate in opposite directions and consequently either direct or reverse movement is imparted through the differential to the vehicle axles 15 and 16. A clutch, not shown, is positioned leftwards of the thrust plate 22, Figure 5, and is normally maintained engaged by spring 21, as in the first described form of the invention, and the preponderance of weight of the gear trains 46, 47, 48, 50, 51, 52 and 53 is substantially off-set by the weight of the clutch on the opposite side.

Figures 7, 8 and 9 illustrate still another modification of the invention, being a combination of features abstracted from the first and second forms, in that the forward speeds are controlled by sliding gears while the reverse speed is accomplished by a direct torque drive.

Inasmuch as the sliding gear features have been fully described in connection with the first form of the invention, it will suffice for a full understanding of the invention to state that the crank shaft 6 carries the same revoluble sleeve 8 as in Figure 1 and on this sleeve is rotatably mounted the worm 10 and slidably mounted the low speed gear 23, see Figure 2, and the gear block 29 which carries the intermediate gear 25. The low gear 23 meshes with a gear 35 on the lay shaft 34, see Figure 2, and the intermediate gear is adapted to mesh with the gear 38 on the lay shaft. The gear 39 on the worm 10 is in constant mesh with the gear 36 on the lay shaft. By these relationships of power-transmitting elements, the same speed changing functions are performed in this modification of the invention as in that disclosed in Figures 1, 2, 3 and 4.

It will be observed however from Figure 9 that the differential cage 12 is alternatively rotated by different unitarily related gears, one being the worm wheel 11 while the other is a bevelled gear 58, these elements being shown as integral with a common hub, journalled upon the vehicle axle and fixed to the differential cage. The worm wheel 11 is concerned with the several forward speed ratios and the direct drive forward speed connections of the transmission. The bevel gear 58 is employed in reverse drive.

Figure 7 shows that the sliding gear block 29 is provided with the gear 24 just as in the first described form of the invention, but the gear 24 does not mesh with an idler gear. There is no idler gear present. Instead, the gear 36 which is in constant mesh with the worm gear 39 has a cylindrical hub 59 forming a bearing for a freely revoluble gear 60, the gear 60 being in constant mesh with a gear 61 on a stub shaft 62. The gear 61 is part of a unit which includes the bevelled gear 63 in constant mesh with the gear 58 on the differential cage 12. Thus when the gear 24 is slid so as to come into mesh with the gear 60 movement in the reverse direction is imparted to the differential and to the vehicle axle. The freedom of the gear 60 relative to the gear 36 permits the worm and the lay shaft 34 to freely change their direction when the reverse drive is applied to the differential through the gear 58.

It will be understood by those skilled in the art that other arrangements of the various gear elements may be made and still maintain the symmetrical balance of the transmission gearing including the clutch and differential, with respect to perpendicular vertical planes embracing the axis of the crank shaft of the engine as well as the axis of the differential and that the specific gear trains and arrangement thereof as illustrated and described in the aforegoing specification are by way of example and not to be construed as limiting the scope of the invention as claimed.

What I claim is:

1. Internal combustion power plant for vehicles comprising an engine, its crank shaft, a vehicle axle, the axes of the crank shaft and vehicle axle being perpendicular, a differential for transmitting power to the vehicle axle, and transmission elements between said crank shaft and differential substantially symmetrically gravitationally balanced both with respect to the axis of said crank shaft and the axis of said differential.

2. Power plant for vehicles comprising a multicylinder engine and its crank shaft, the cylinders being in spaced groups providing an intermediate space between the cranks on the crank shaft, a differential for transmitting power to the vehicle axle, and transmission elements in the space between the cranks, connecting said crank shaft and differential including a clutch, substantially symmetrically balanced both with respect to the axis of said crank shaft and the axis of said differential.

3. Power plant for vehicles comprising an engine having a crank shaft, a vehicle axle, and a differential substantially symmetrically balanced both with respect to the axis of said crank shaft and said vehicle axle for transmitting power to the vehicle axle, including a sleeve telescoped upon said crank shaft between said crank shaft and differential, cooperating clutch members carried respectively by said crank shaft and said sleeve, one fixed, the other slidable, a gear revoluble on said sleeve constantly in mesh with a gear on said differential, a lay shaft, gears on said lay shaft including one constantly engaged with the revoluble gear on said sleeve, and gears selectively slidable along said sleeve on opposite sides of said revoluble gear, adapted to be operatively connected with respect to the gears on the lay shaft, and a direct drive connection between one of said sliding gears and said revoluble gear.

4. Power plant for vehicles comprising an engine having a crank shaft and a differential for transmitting power to the vehicle axle, transmission elements between said crank shaft and differential substantially symmetrically balanced both with respect to the axis of said crank shaft and the axis of said differential including a sleeve telescoped upon said crank shaft between said crank shaft and differential, cooperating clutch members carried selectively by said crank shaft and said sleeve, one fixed, the other slidable, a gear revoluble on said sleeve constantly in mesh with a gear on said differential, a lay shaft, gears on said lay shaft including one constantly engaged with said revoluble gear, gears selectively slidable along said sleeve on opposite sides of said revoluble gear adapted to be operatively connected with respect to the gears on said lay shaft, operating means for said sliding gears on the opposite side of said crank shaft from said lay shaft, and a direct drive connection between one of said sliding gears and said revoluble gear.

5. Power plant for vehicles comprising an engine having a crank shaft and a differential for transmitting power to the vehicle axle, transmission elements between said crank shaft and differential substantially symmetrically balanced both with respect to the axis of said crank shaft and the axis of said differential, including a sleeve telescoped upon said crank shaft between said crank shaft and differential, cooperating clutch members carried respectively by said crank shaft and said sleeve, one fixed, the other slidable, a worm revoluble on said sleeve constantly in mesh with a gear on said differential, a lay shaft, gears on said lay shaft including one constantly engaged with a gear unitary with said worm, gears selectively slidable along said sleeve on opposite sides of said revoluble gear adapted to be operatively connected with respect to the gears on the lay shaft, and a direct drive connection between one of said sliding gears and said worm.

6. Power plant for vehicles comprising an engine having a crank shaft and differential, driving connections substantially symmetrically balanced both with respect to the axis of the crank shaft and the axis of the differential, for transmitting power to the vehicle axle, including lay shafts on either side of the axis of the crank shaft and intersecting the axis of the differential, similar gear trains on each lay shaft, cooperating means on each lay shaft on one side of the differential axis constantly connected to the differential, and driving gears on each lay shaft on the opposite side of the differential axis, and a sliding gear on the crank shaft selectively engageable with either of said driving gears.

7. Power plant for vehicles comprising an engine having a crank shaft and differential, driving connections substantially symmetrically balanced with respect to the axis of said crank shaft and the axis of the differential for transmitting power to the vehicle axle, comprising lay shafts on either side of the axis of the crank shaft and intersecting the axis of the differential, gears on said differential, one on each side of the axis of said crank shaft, gears on the corresponding end of each lay shaft, on one side of the axis of the differential respectively connected to the said differential gears, driving gears one on each of the opposite ends of said lay shafts, and a sliding gear on the crank shaft selectively engageable with either of said driven gears.

8. Power plant for vehicles comprising an engine having a crank shaft and a differential for transmitting power to the vehicle axle, two gears unitarily connected to said differential, transmission elements between said crank shaft and differential substantially symmetrically balanced both with respect to the axis of said crank shaft and the axis of said differential comprising a sleeve telescoped upon said crank shaft between said crank shaft and differential, cooperating clutch members carried respectively by said crank shaft and sleeve, one fixed, the other slidable, a gear revoluble on said sleeve in constant mesh with one of the unitary gears on said differential, a lay shaft, a set of gears on said lay shaft including one constantly in mesh with said revoluble gear, gears selectively slidable along said sleeve on opposite sides of said revoluble gear adapted to be engaged with a gear on the lay shaft for forward speed changes, a direct drive connection between one of said sliding gears and said revoluble gear, a gear on said lay shaft revoluble independently thereof and in constant connection with the other unitary gear on the differential, said independently revoluble gear being engageable by one of the sliding gears on the crank shaft for reverse drive, independently of the direct drive connection between the revoluble gear on the crank shaft and the differential.

MATTHEW A. PALEN.